No. 766,768. PATENTED AUG. 2, 1904.
M. J. OWENS.
GLASS SHAPING MACHINE.
APPLICATION FILED APR. 13, 1903.
NO MODEL. 10 SHEETS—SHEET 3.
Fig. 3.
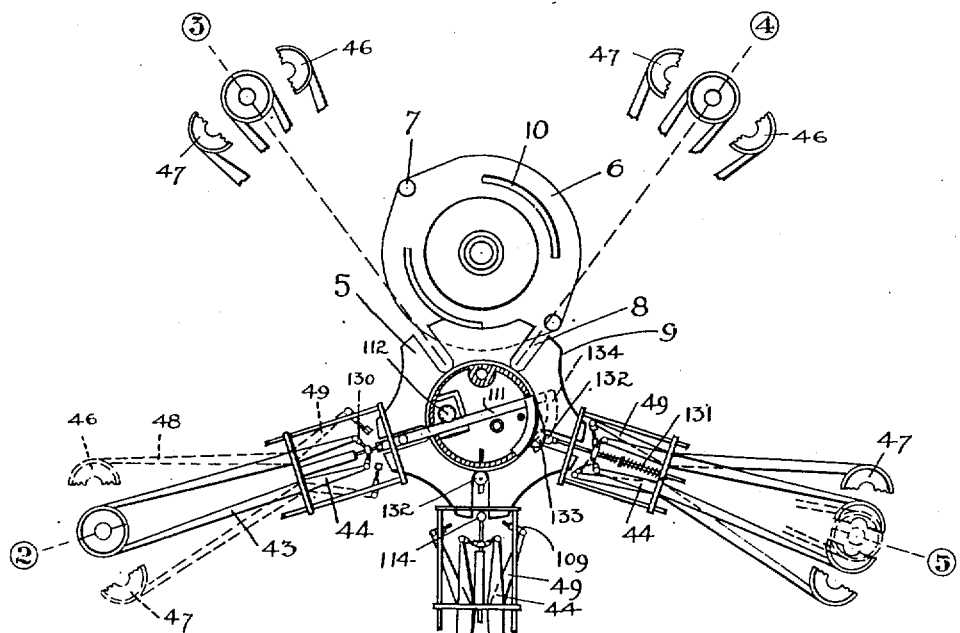
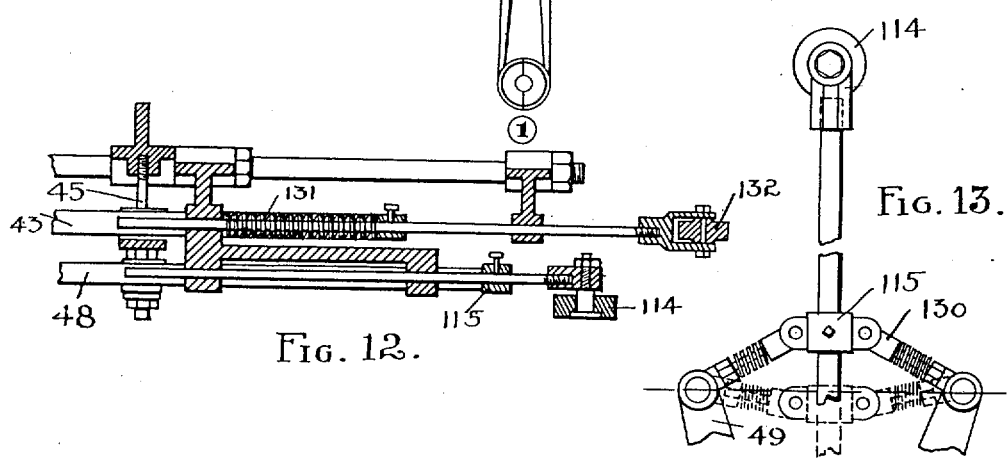
Fig. 12.
Fig. 13.
Witnesses: Inventor.
MICHAEL J. OWENS
By James Whittemore
Atty.

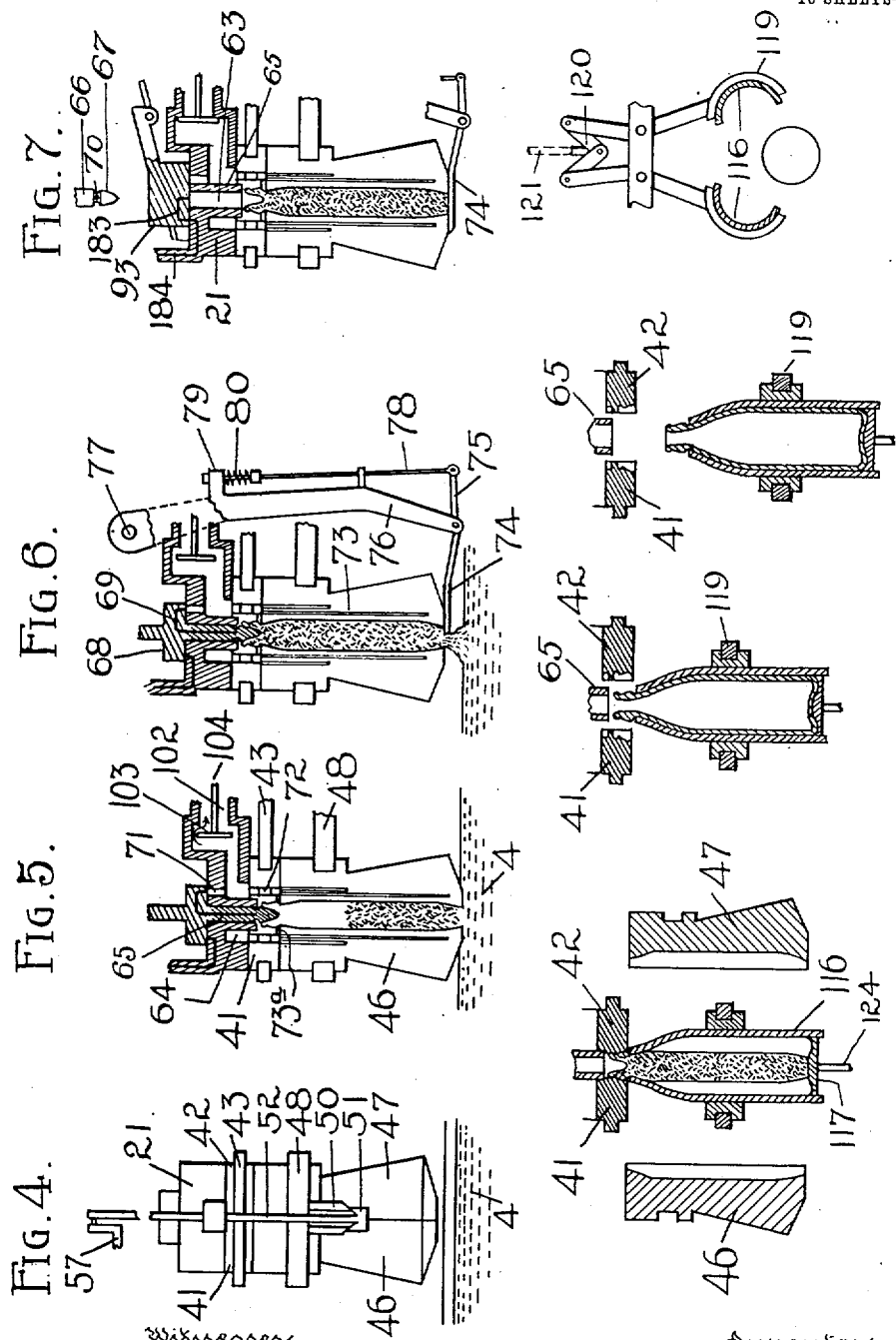

No. 766,768. PATENTED AUG. 2, 1904.
M. J. OWENS.
GLASS SHAPING MACHINE.
APPLICATION FILED APR. 13, 1903.
NO MODEL. 10 SHEETS—SHEET 6.

Witnesses: Inventor.
Geo. W. Gauge MICHAEL J. OWENS
H. C. Smith James Whittemore
Atty.

No. 766,768. PATENTED AUG. 2, 1904.
M. J. OWENS.
GLASS SHAPING MACHINE.
APPLICATION FILED APR. 13, 1903.
NO MODEL. 10 SHEETS—SHEET 7.

Witnesses
Geo. H. Graham
H. C. Smith

Inventor
Michael J. Owens
By James Whittemore
Atty.

No. 766,768. PATENTED AUG. 2, 1904.
M. J. OWENS.
GLASS SHAPING MACHINE.
APPLICATION FILED APR. 13, 1903.
NO MODEL. 10 SHEETS—SHEET 8.

Witnesses
Inventor
Michael J. Owens
By James Whittemore
Atty.

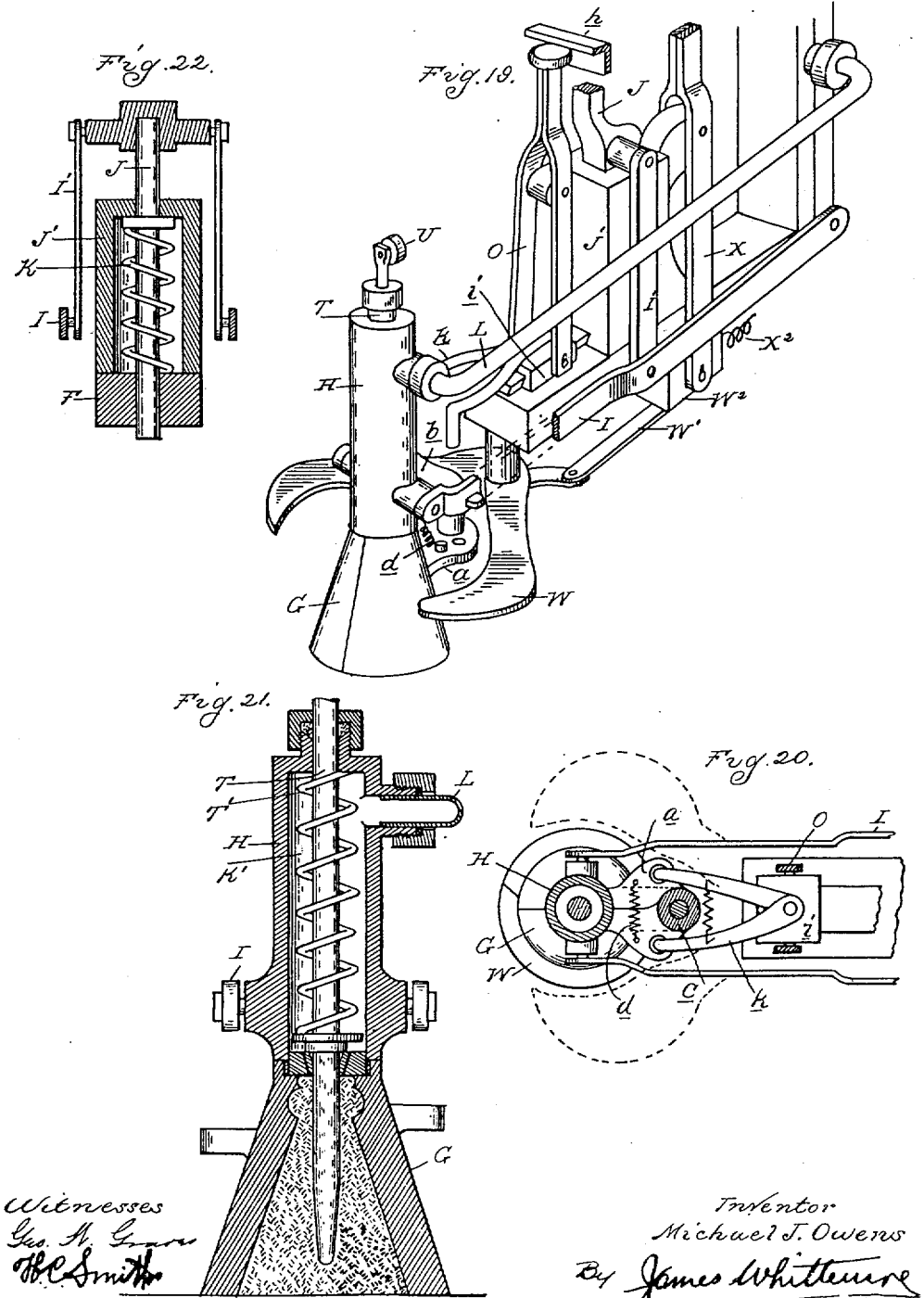

No. 766,768. PATENTED AUG. 2, 1904.
M. J. OWENS.
GLASS SHAPING MACHINE.
APPLICATION FILED APR. 13, 1903.
NO MODEL. 10 SHEETS—SHEET 10.
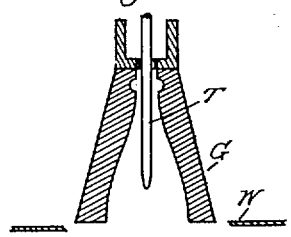
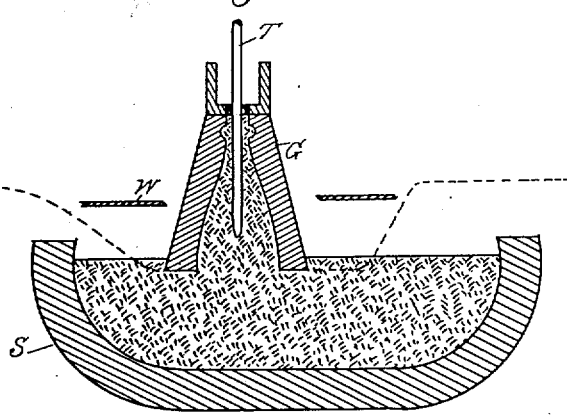
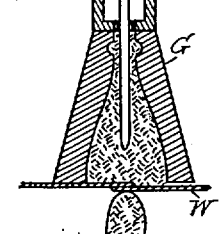
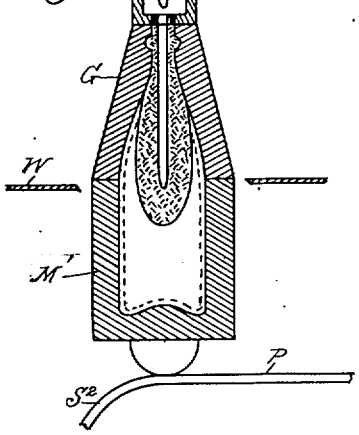
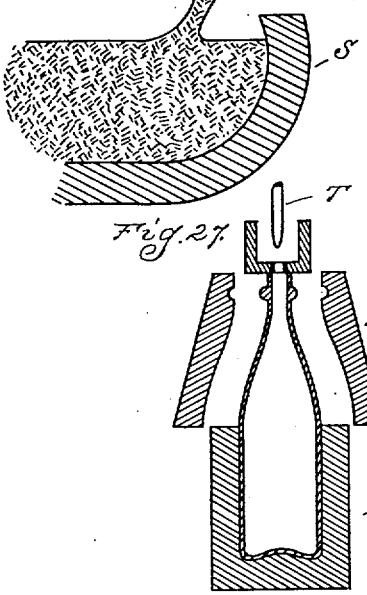
Witnesses
Geo. H. Graves
H. C. Smith
Inventor
Michael J. Owens
By James Whittemore
Atty.

No. 766,768. Patented August 2, 1904.

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

GLASS-SHAPING MACHINE.

SPECIFICATION forming part of Letters Patent No. 766,768, dated August 2, 1904.

Application filed April 13, 1903. Serial No. 152,388. (No model.)

*To all whom it may concern:*

Be it known that I, MICHAEL J. OWENS, a citizen of the United States, residing at Toledo, in the county of Lucas and State of Ohio, have invented certain new and useful Improvements in Glass-Shaping Machines, of which the following is a specification, reference being had therein to the accompanying drawings.

The invention relates to the construction of a machine for shaping glass; and it consists in the construction of a machine which will collect or gather the desired quantity of glass; further, in shaping the gathered glass into the form of a blank which may be blown and distributing the glass around a blow-opening in the shaping of said blank; further, in the blowing mechanism coöperating with the gathering and shaping device by which the gathered blank may be blown to its final form.

The operations of the machine as herein shown are entirely automatic, and the machine operates continuously to gather the glass, shape it into the desired blank, and blow it to form without the intervention of any labor whatever. While I believe that such automatic machine is the most desirable form in which to express my invention, I do not think that I am limited to the use of such an automatic machine nor to the manufacture of such hollow ware as bottles in finished shape, as herein shown.

Figure 1:
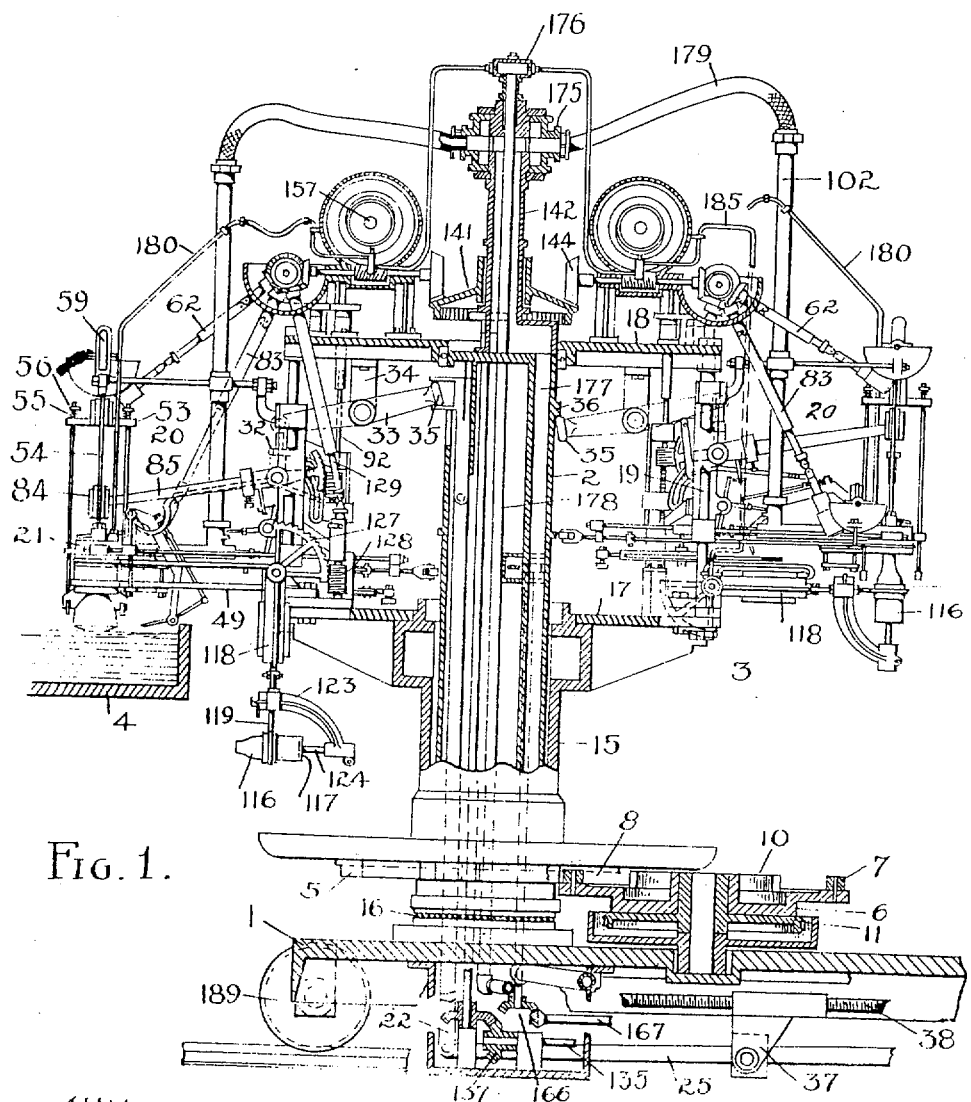
Figure 2:
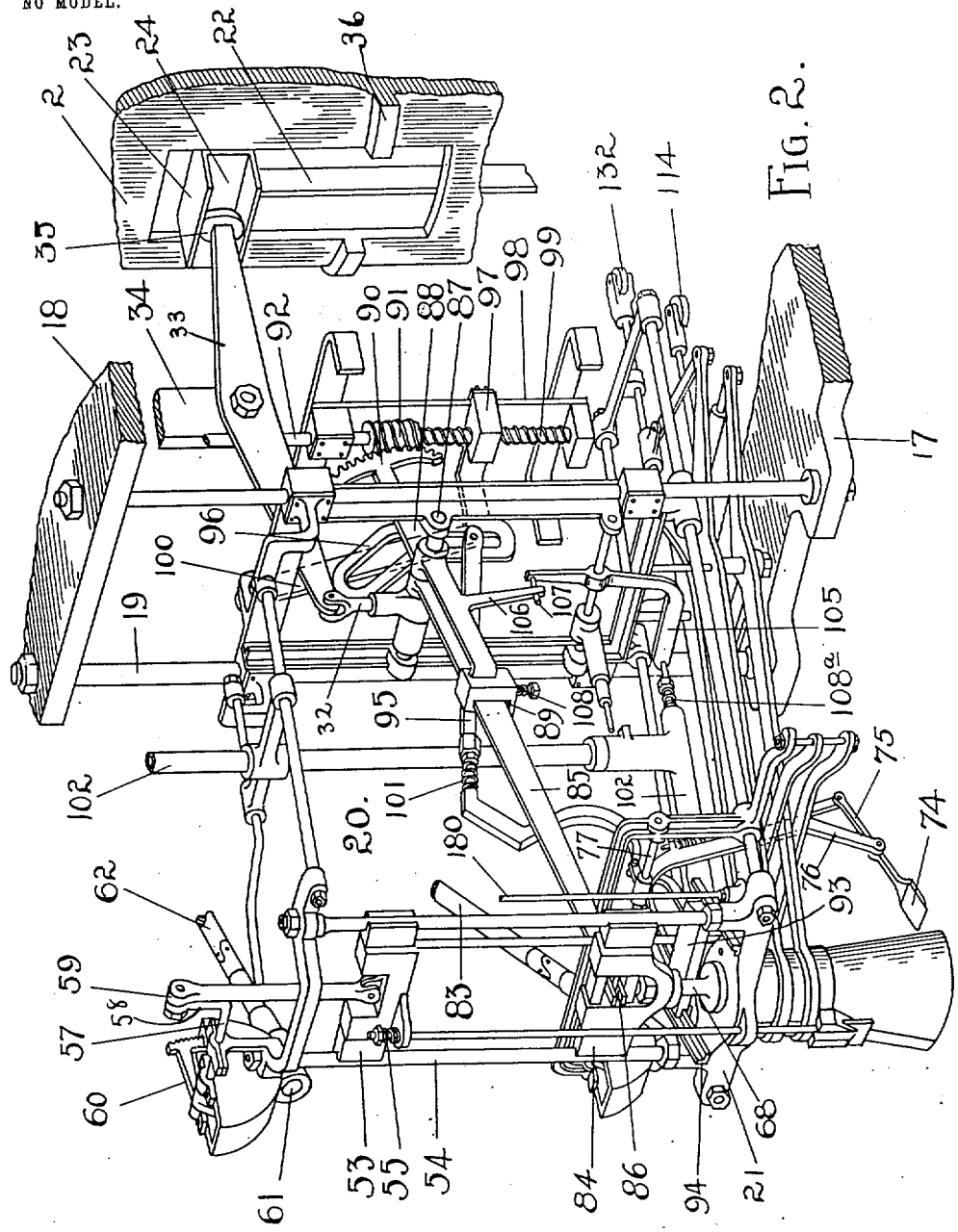
Figure 14:
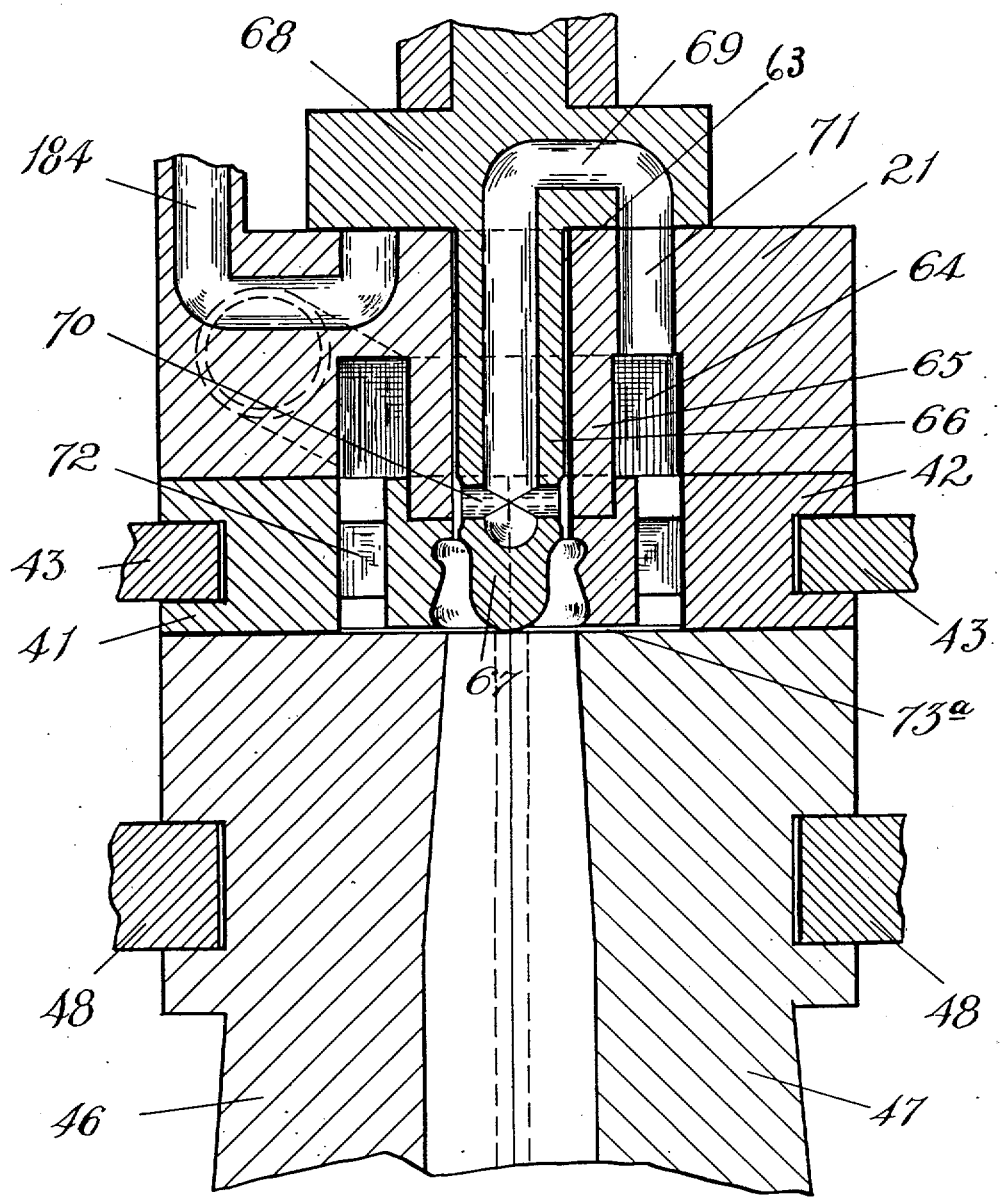
Figures 15, 16:
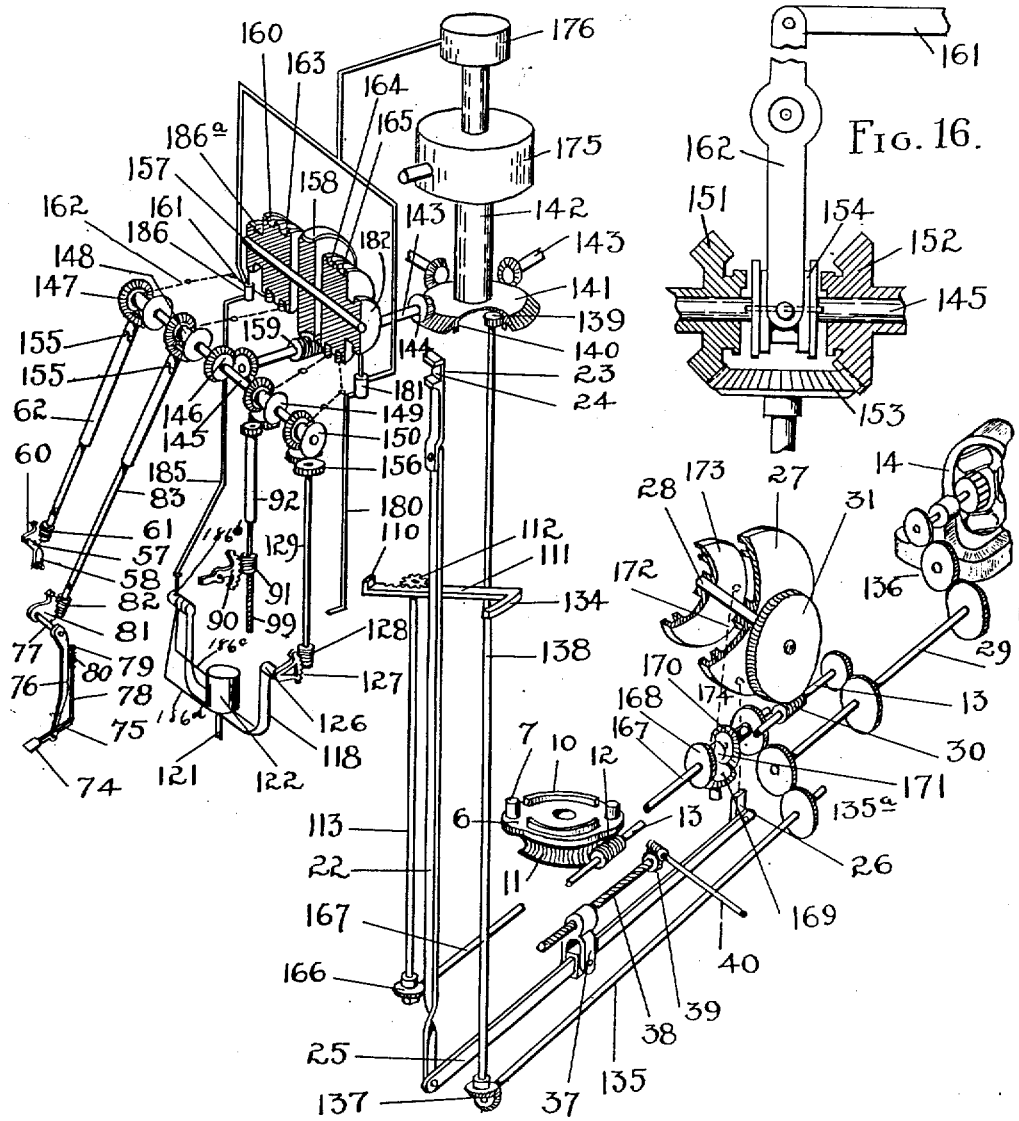
Figure 17:
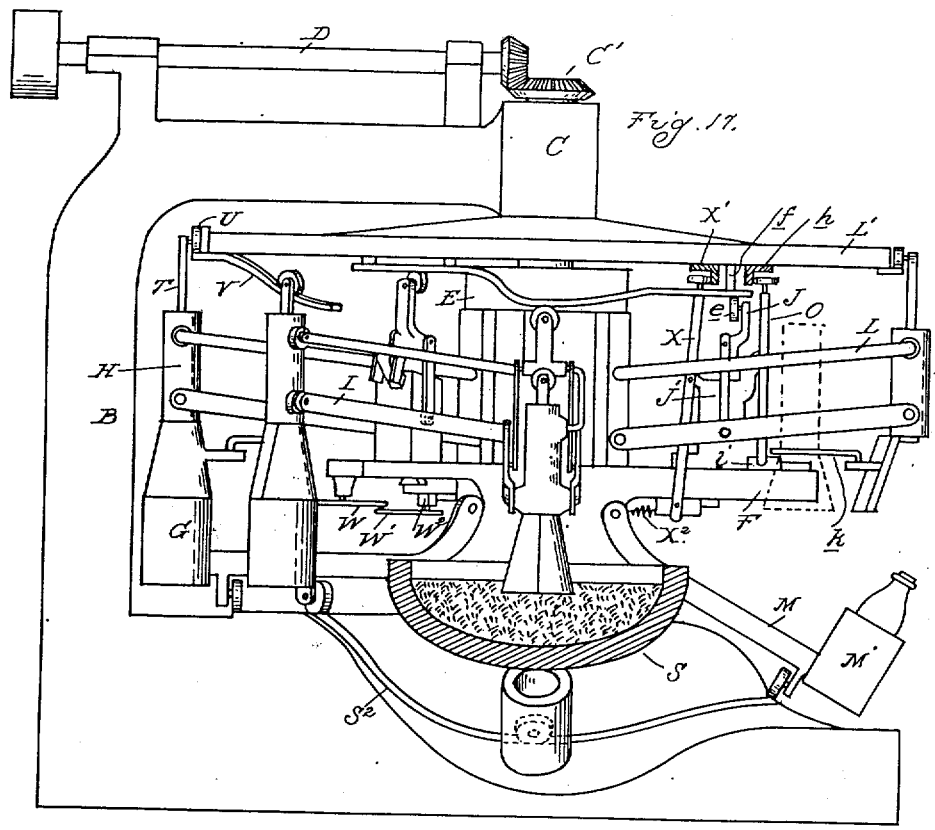
Figure 28:
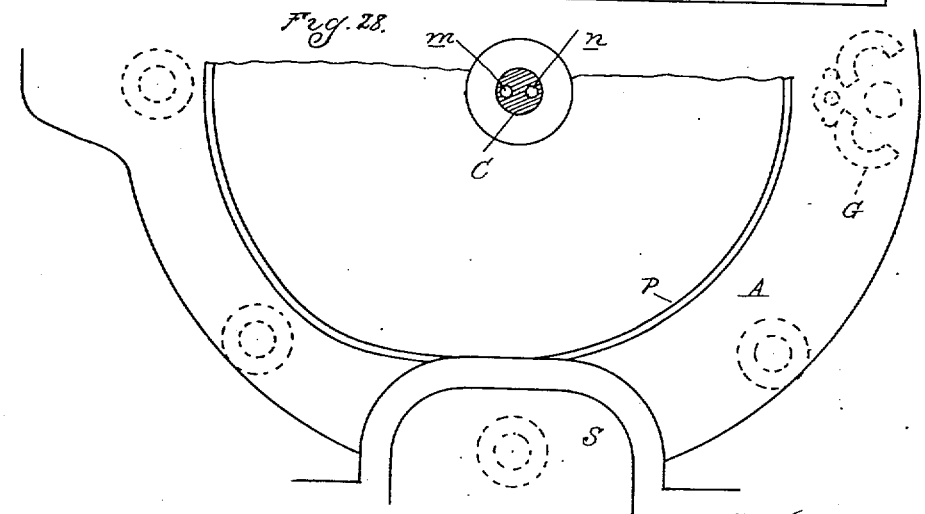
Figure 18:
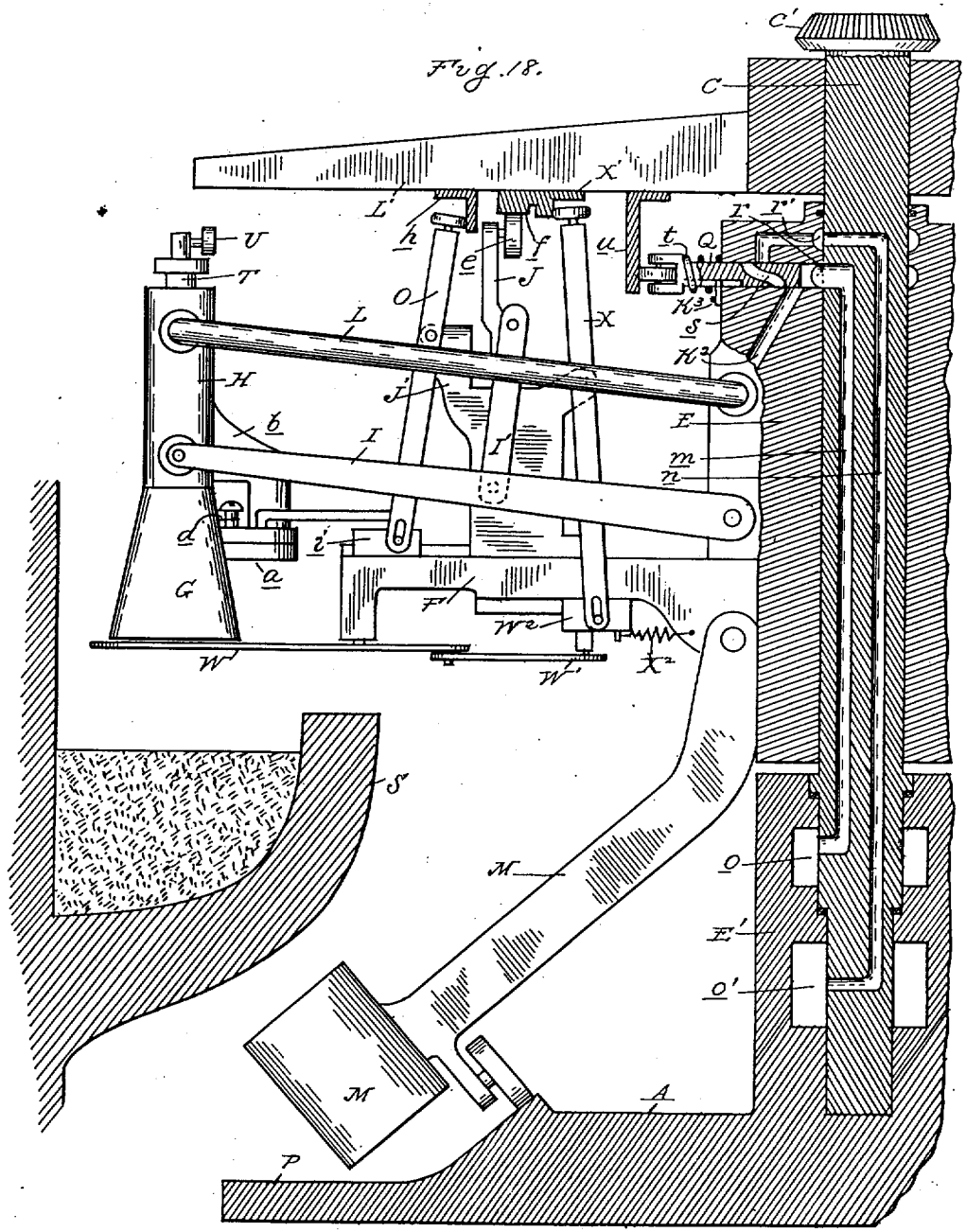

In the drawings, Figure 1 is a sectional elevation of the machine. Fig. 2 is a perspective view of one of the operating mechanisms carried by the machine. Fig. 3 is a diagrammatic plan view. Figs. 4, 5, 6, 7, 8, 9, 10, and 11 are diagrammatic views illustrating the successive steps in the operation of the blank forming and finishing molds of the machine.
Fig. 12 is a vertical section illustrating the operating mechanism for the blank-mold sections. Fig. 13 is a plan view of the inner portion thereof. Fig. 14 is an enlarged sectional view of the suction-head and a portion of the blank-forming mold. Fig. 15 is a diagrammatic view illustrating the drive connections and timing devices for the various mechanisms. Fig. 16 is a section of one of the reverse driving-gears. Fig. 17 is an elevation of my improved machine, showing the tank or glass pool in section, some of the details being omitted for the sake of clearness. Fig. 18 is a vertical central section through half of the machine, partly in elevation, illustrating one of the blank-forming or parison molds in position after it has been lifted from the molten glass. Fig. 19 is a perspective view of one of the parison-forming molds and the actuating mechanism for the various parts moving therewith. Fig. 20 is a horizontal section illustrating particularly the actuating means for the mold-sections. Fig. 21 is a vertical section through the upper part of the parison-forming mold. Fig. 22 is a vertical section through the bracket on the arm shown in Fig. 19, illustrating the manner of arranging the spring-support for the mold-carrying arm. Figs. 23, 24, 25, 26, 27, and 28 are diagram sections illustrating the position of the mold parts and shears at different points in the operation.

*General structure.*—1 is a base, 2 is a column rising from this base, and 3 is a revoluble frame journaled upon said column. This frame carries the mechanism for completely forming the bottle or other article to be blown, which mechanism is designed to complete the cycle of its movements with each revolution of the frame. The mechanism includes means for gathering the glass and forming the blank or parison, which is accomplished while the frame 3 is stationary and the blank-forming mold is in registration with the tank or open-top pool of molten glass 4. The succeeding operations in forming the article are accomplished during the interval in which this blank-forming mechanism is carried around by the frame, so that when a complete revolution is accomplished a bottle will have been formed and the gathering means will again be in condition for repeating its operation.

To increase the capacity of the machine, a plurality of duplicate mechanisms are arranged around the frame 3 and are carried thereby to successively be registered with the tank 4. Thus the frame 3 must be alternately partially rotated and then permitted to remain stationary, this intermittent movement being imparted thereto by any suitable mechanism, such as the star-wheel 5 at the base of the frame and the rotary crank 6 adjacent thereto, having the roller-wrists 7 for engaging the radial slots 8 in the star-wheel. The frame 3 is locked in position after each partial rotation by providing concave bearings 9 on the star-wheel intermediate the radial slots 8, with which a segment 10 on the crank 6 is adapted to engage. Thus in operation the rotation of the crank 6 will cause the wrist 7 to enter the radial slot 8 to rotate the wheel 5 through a certain angle of movement and then disengage from the slot, at which point in the movement the segmental flange 10 engages with the concave bearing 9 and locks the frame until another wrist 7 engages with the succeeding radial slot. The crank 6 is constantly driven by any suitable mechanism, such as the worm-wheel 11, which engages with a worm 12 on the longitudinally-extending shaft 13, which shaft is connected by intervening gearing with a motor 14, mounted upon the base.

The frame 3 preferably comprises a tubular standard 15, which is supported upon a roller-bearing 16 and has secured to its upper end the head 17.

18 is a head arranged above the head 17 and connected thereto by a series of vertical posts 19, arranged around the periphery of said heads.

*The gathering and blank-forming means.*—Each of the duplicate mechanisms carried by the frame 3 includes a gathering and blank-forming means of the following construction: 20 is a vertically-movable support, which is shown in the form of a skeleton frame slidingly secured to a pair of vertical posts 19. This frame projects outward from the frame 3 and carries at its outer end the suction-head 21, the sectional blank-forming mold, and other mechanism which will be hereinafter described. A common mechanism is provided for lowering and raising each of the frames 20 as they are successively registered with the tank 4. This mechanism consists of a rod 22, arranged within the column 2 and having at its upper end a head 23, projecting outward through the slot in said column and provided with a lateral slot or way 24. The lower end of the rod 22 is connected with a lever 25, which at its opposite end is connected by a link 26 with the actuating cam-wheel 27, said cam being secured to a shaft 28, journaled in bearings upon the base. The shaft 28 is driven from the motor 14 through the medium of a shaft 29, having a gear connection with said motor and the shaft 13, together with a worm 30 on said shaft 13 and a worm-wheel 31 on the shaft 28, the arrangement being such that the rotation of the cam-wheel 27 will periodically impart a vertical reciprocation to the rod 22.

Each of the frames 20 is connected by a link 32 with a lever 33, fulcrumed in a depending bracket 34 on the head 18. The inner end of the lever carries an antifriction-roll 35, which is adapted to engage with a way 36, surrounding the column 2, but interrupted at one point by the slot containing the vertically-movable head 23. This head is normally in a position where the slot 24 will register with the way 36, so that the roll 35 can travel from engagement with said way into said slot. When thus engaged, the movement of the head by the mechanism previously described will first carry upward the inner end of the lever 33, permitting the frame 20 to descend. The reverse movement of the head 23 will again lift the frame to its normal position. To change the amount of movement of the frame 20 to accommodate the machine for different levels of glass in the tank 4, an adjustable fulcrum 37 is provided for the lever 25, which may be shifted in position to change the throw of said lever. This fulcrum may be adjusted by an engagement with a screw 38, which has a worm-and-gear connection 39 with a hand-wheel shaft 40, extending to the side of the base.

*The blank-forming mold.*—As has been stated, the gathering and blank-forming mold is carried at the outer end of the frame 20. This mold is divided horizontally and vertically into separable sections, said sections together forming a mold-cavity of the shape of the blank and open at its lower end. Each of the sections is carried by a jaw pivoted to the frame 20 and adapted to swing in a horizontal plane. The upper mold-sections 41 and 42 together constitute what I shall term the "neck-mold." This term is used as merely indicating the portion of the blank which is formed by this mold-section in the operation of forming a bottle. I do not, however, intend to be limited by this term to a construction which is only adapted for the formation of the neck of a bottle, as it is obvious that the machine may be put to other uses. The sections 41 and 42 are respectively connected to the jaws 43 and fulcrumed upon the vertical pins 45, depending from the frame 20.

46 and 47 are the two lower mold-sections, constituting what I shall term the "body-mold," and these sections are carried by the jaws 48, also fulcrumed on the pins 45. The jaws supporting the mold-sections are connected with mechanism which will be hereinafter described, by means of which the body-mold sections and neck-mold sections may be independently separated. In normal position these sections lie adjacent to each other and the neck-mold sections are adjacent to the lower face of the head 21. To hold them tightly together, so as to form a tight joint, I provide a clamping means of the following construction: 50 represents lugs projecting from opposite sides of each of the sections 46 and 47 and adjacent to their meeting faces. 51 is a hook having opposite inclines thereon, adapted to engage with corresponding inclined faces on the lugs 50. The hooks 51 are secured to rods 52, passing upward through bearings in the suction-head and secured at their upper ends to the cross-head 53, slidingly engaging vertical posts or guides 54 of the frame 20. A yielding connection between the rods 52 and the cross-head 53 is provided by sleeving the springs 55 on said rod, which are arranged between shoulders 56 thereon and the cross-head.

57 is a crank-shaft journaled in bearings in the frame 20 and having a crank 58 thereon connected by a rod 59 with the cross-head 53. 60 is a worm-segment secured to the shaft 57, and 61 is a worm meshing therewith and driven by a universal-jointed shaft 62, which will be hereinafter described.

With the construction just given the rotation of the crank 58 will cause the upward movement of the cross-head 53, which will draw upward upon the rods 52, thereby causing the hooks 51 to clamp the lugs 50. The springs 55 will permit of sufficient yielding between the rods and cross-head to prevent danger of breakage of parts and at the same time to maintain sufficient tension to firmly lock the mold-sections together. In addition to the clamping of the mold-sections 46 and 47 to each other these sections are also firmly clamped against the neck-mold sections 41 and 42, and the latter in turn are clamped against the lower face of the suction-head 21.

The suction-head 21 has formed centrally therethrough the aperture 63, which is in axial alinement with the cavity of the blank-forming mold. Surrounding the central aperture is an annular chamber 64, which is separated from aperture 63 by the wall 65. The latter preferably extends downward beyond the lower face of the suction-head and engages with the corresponding recess in the neck-mold sections 41 and 42. 66 is a plunger adapted to pass through the aperture 63 and having formed at its lower end the core 67. The function of this core is to form a blowing-cavity in the upper end of the blank and also to shape a portion of the interior of the neck of the bottle. The plunger 66 is of slightly lesser diameter than the aperture 63, so that when in position there will be a slight space for the passage of the air from the mold-cavity around the plunger. This space is, however, so slight as not to permit the drawing of glass into the passage.

68 is the block upon the plunger, which when the latter is in position rests upon the upper face of the suction-head 21. 69 is a passage formed within the plunger and leading from an annular groove 70, which is just above the core 67. This passage extends into the block 68 and communicates with a port which is in registration with the port 71 in the suction-head connecting with the vacuum-chamber 64. Thus whenever the plunger is in position the vacuum-chamber 64 is in direct communication with the annular groove 70, which latter communicates through the narrow slit surrounding the plunger with the mold-cavity. The annular recess 64 within the suction-head communicates with the corresponding annular recess 72, formed in the neck-mold sections, and this recess in turn communicates with channel 73ª, formed in the adjacent faces of the body-mold sections 46 and 47. These channels are for the purpose of preventing the possibility of leakage of air into the mold-cavity between the adjacent faces of the mold-sections. All such leakage will first pass into the vertical channel 73 and annular channel 72, which are always in communication with the vacuum-chamber.

With the mold constructed as thus far described it is evident that when the supporting-frame therefor, 20, is lowered the lower face of the body-mold sections 46 and 47 will be dipped into the molten glass in the tank 4, as shown in Fig. 5. If then the suction is applied to the vacuum-chamber 64, the pressure will be reduced in the mold-cavity, which will cause the external atmospheric pressure to force or move the glass upward through the open end of the cavity until the latter is completely filled. The air is exhausted from the cavity not only through the crevice surrounding the plunger 66, but also preferably through a slight crevice 73ª between the neck and body forming molds and intermediate the annular chamber 64 and the mold-cavity. These crevices are sufficient to rapidly exhaust the air from the cavity, but will not permit the molten glass to enter therein on account of the chilling effect of the metal.

*Cut-off.*—After the mold-cavity is filled with glass and the molds are again raised by the upward movement of the frame 20 it is necessary to cut off the adhering connection with the glass from the tank. This is preferably accomplished by blade 74, which is moved across the lower face of the body-mold sections, first cutting off the glass and then forming a bottom for the blank-mold. The blade 74 is secured to a lever 75, which is fulcrumed at the end of a rock-arm 76, the latter being connected to a rock-shaft 77, journaled in bearings in the frame 20. A rod 78 connects the opposite end of the lever 75 with a bracket 79 on the arm 76, and a spring 80 is sleeved upon the rod to form a yielding buffer, which permits the blade 74 to travel across the bottom of the mold in contact therewith. The rock-shaft 77 is actuated through the medium of a worm-segment 81, engaging with a worm 82 on universally-jointed shaft 83, extending to the controlling mechanism, to be hereinafter described. Before the blank thus formed can be blown the core 67 must be withdrawn. This is accomplished by the raising of the plunger 66 through the following mechanism: 84 is a second cross-head slidingly secured to the vertical posts or guides 54, and this cross-head is connected to the shank of the plunger 66.

85 is a lever engaging a slotted bearing 86 in the cross-head 84 and pivoted upon a shaft 87 at the rear of frame 20. Adjacent to this lever 85 and pivoted upon the same shaft is the lever 88, which at its forward end has a slotted bearing 89 embracing the lever 85. The opposite end of the lever 88 has formed thereon a worm-segment 90, which meshes with a worm 91 upon a vertical shaft 92. Thus the rotation of the worm in one direction will cause a movement of the segment 90 and through the lever 88 this movement will be imparted to the lever 85 and from the latter to the cross-head 84, which will raise the plunger 66 and withdraw the core 67 from the mold-cavity and the suction-head.

After the core is withdrawn it is necessary to close the aperture 63 in the suction-head before admitting the blowing-air thereto. For this purpose a cover-plate 93 is provided, which is slidingly secured in guides 94 on the suction-head. This cover-plate is withdrawn from the path of the plunger during the movement of the latter by a link 95, which is actuated by a cam 96. The cam 96 is secured to a vertically-sliding head 97, engaging with a guide 98 and actuated by a screw 99 on the shaft 92. The end of the link 95 which engages with the cam 96 is supported by the swinging link 100, pivotally secured to the frame 20. With the arrangement just described during the upward movement of the cross-head 84 and plunger 66, due to the actuation of the worm 91, a movement will be simultaneously imparted to the cam 96 through the medium of the screw 99 and head 97. The movement of the cam will cause the link 95 to be projected forward, which will carry the cover 93 down the incline guides 94 until it bears against the upper faces of the suction-head and covers the aperture 63. A yielding section or a spring 101 is preferably placed in the link 95, so that the cover 93 may be firmly pressed against the suction-head by the mechanism described without danger of breakage of parts. Prior to the withdrawal of the plunger and the movement of the cover 93 the suction must be cut off from the vacuum-chamber 64. The suction connection to the vacuum-chamber is formed by conduit 102, which is connected to the suction-head, and in this conduit is located a valve 103. 104 is the valve-stem, which passes out from the conduit and extends into proximity to a lever 105, fulcrumed on frame 20. The opposite arm of this lever extends into the path of an arm 106, depending from the lever 88, which arm preferably carries the adjustable screw 107 for contacting with the lever 105. As has already been described, the lever 88 has the slotted bearing 89 embracing the lever 85. The slot in this bearing is of sufficient length to permit a slight lost motion between the levers 88 and 85, which is, however, normally taken up by a spring 108. In the downward movement of the levers 85 and 88 the former will be held against the lower end of the slotted bearing by the tension of the spring 108 until the block 68 of the plunger rests upon the suction-head. The lever 88 is, however, provided with a further movement, which is permitted by the slotted bearing and the yielding of the spring 108. During this further movement the screw 107 contacts with the lever 105 and actuates the same, together with the stem 104 in the path of said lever, so as to open the valve 103. This valve is therefore held open as long as the parts remain in this position. In the reverse movement, which withdraws the plunger, the worm 91 and segment 90 will first actuate the lever 88 and withdraw the screw 107 from the lever 105 before any motion is imparted to the lever 85. Thus the valve 103 is closed through the actuation of a spring 108ª by the withdrawal of the core.

In the subsequent operation of completing the bottle or other article formed the body-blank-mold sections must be separated and a blowing-mold of the desired configuration placed around the blank. During this operation the blank is suspended by reason of this engagement with the neck-mold, and for this purpose the latter is formed of such a shape as to interlock with the blank. As shown, this interlocking is produced by grooving the interior of the neck-mold so as to form a rib in the blank; but it is obvious that any other shape which would lock the blank to the mold would answer the purpose equally well. The body-blank-mold sections are opened by the movement of the supporting-jaws 48. These jaws are preferably actuated by rearwardly-extending arms 49, which are connected to each other by toggle-levers 109. During the gathering operation these toggle-levers are in a position to spread the arms 49, and therefore hold the mold-sections 46 and 47 together. The sections are opened by a movement of the toggle which will draw the arms 49 toward each other, and thereby separate the jaws 48 and mold-sections 46 and 47.

The opening of the mold-sections is preferably accomplished after the mold has traveled a partial rotation of the frame 3 and is in the first position of rest after the dipping-point. The actuating device for the toggle consists of a hook 110, which projects from a reciprocatory bar 111, the latter being slidingly secured in bearing formed in the column 2. The bar 111 has a rack formed thereon, which is in engagement with the pinion 112 on a shaft 113, extending vertically downward within the column 2. This shaft is actuated by mechanism which will be hereinafter described, so as to draw inward the bar 111 and cause the hook 110 to actuate the toggle and separate the mold-sections, as has been described. The engagement between the toggle and the hook is formed by a roll 114, which is connected to the central link 115 of the toggle.

The finishing or blowing mold is preferably formed of two laterally-separable body-sections 116 and bottom section 117. These are carried by a swinging arm or frame 118, which is pivotally connected to the head 17. The mold-sections 116 are carried by jaws 119, which are pivotally connected to the frame 118. The opposite ends of these jaws are connected to toggle-lever 120, which in turn are connected to the piston-rod 121 of a pneumatic motor 122. The bottom section 117 is secured to an arm 123 of the frame 118 through the medium of a stem or shank 124, and said stem is adjustably secured to the arm 123. The frame 118 has trunnions 126, which are journaled in bearings on the head 17, and upon one of these trunnions is a worm-segment 127, meshing with the worm 128 upon a vertical shaft 129. The frame 118 may be swung from a downwardly-hanging position into a substantially horizontal position through the actuation of the shaft 129, worm 128, and segment 127, and in this latter position the mold-sections 116 will be arranged upon opposite sides of the blank. The sections are closed through the actuation of the pneumatic motor 122 and the toggle 120. After the blowing of the blank within the finishing-mold, as will be hereinafter described, the neck-molds are open to disengage the same from the neck of the bottle and to permit the latter to be withdrawn by the finishing-molds. These neck-molds are operated by connections similar to those used for actuating the body-blank molds, comprising the rearwardly-projecting arms 44 on the jaws 43 and the connecting-toggles 130. The neck-molds are, however, open for only a brief interval of time, and therefore are normally held closed by the tension of a spring 131, bearing against the toggle-joint. The opening of the molds is caused by engagement of a roll 132 on the toggle-joint with a stationary cam 133 on the column 2. Before the completion of the cycle of movements the body-blank mold must be again closed, which may be effected either by a stationary cam on the column engaging with the roll 114 or, as shown, by a head 134 on the opposite end of the rack-bar 111. This head is adapted to engage with the roll 114 when the molds are in their last stationary position before being again registered with the tank, and thus when the molds are finally turned into registration with said tank they are closed and in position for the dipping operation.

*Drive connections and timing.*—All of the mechanism which has thus far been described is preferably actuated by the motor 14 through connecting mechanism constructed as follows:

135 is a shaft extending longitudinally of the base and driven from the motor 14 through a gear-train 136, shaft 29, and gears 135ª. 137 represents beveled gears connecting the shaft 135 with the shaft 138, which extends vertically upward within the hollow column.

139 is a pinion at the upper end of the shaft 138, meshing with an internal gear 140, secured to the beveled gear-wheel 141. This wheel is journaled upon an upward extension 142 of the column 2 and above the head 18.

143 represents radial shafts arranged around the head 18 and corresponding in number to the duplicate mechanisms on the frame 3. The inner ends of these shafts have secured thereto the beveled pinions 144, which mesh with the beveled gear 141 and derive motion therefrom.

145 represents shafts arranged perpendicularly to the shafts 143, at the outer ends thereof, and connected therewith by intermeshing-beveled pinions 146. Upon each of the shafts 145 are mounted four independent reverse drive connections, respectively, 147, 148, 149, and 150. These reverse drive connections are all similar in construction, and each comprises a pair of oppositely-facing beveled gear-wheels 151 and 152, loosely sleeved upon the shaft, and an intermediate beveled gear 153, intermeshing therewith and constituting the driven member. Between the beveled gear-wheels 151 and 152 is arranged a coupling-sleeve 154, which is feathered to the shaft and is capable of being moved longitudinally thereon into engagement with either one of the beveled gear-wheels 151 and 152. Thus when the sleeve is in engagement with the beveled gear-wheel 151 the beveled gear 153 will be driven in one direction, and when said sleeve is engaged with the opposite gear 152 the gear 153 will be driven in the opposite direction. Again, when the sleeve 154 is in its central position all of said beveled gear-wheels remain stationary.

The reverse drive-gearing 147 has its driven beveled gear secured to the shaft 62, which actuates the clamping mechanism. The reverse drive-gearing 148 is similarly connected to the shaft 83, which actuates the cut-off mechanism, and the reverse drive-gearing 149 is connected to the shaft 92, actuating the mechanism for operating the plunger, the cover-plate 93, and the suction-valve 103. All of these shafts are telescopic, so as to permit the vertical movement of the frame 20. They are also provided with universal couplings 155, which permit the change of angle due to the raising and lowering of the frame. The reverse drive-gearing 150 is connected, through a gear-train 156, with the shaft 129 for actuating the raising and lowering mechanism for the finishing-mold.

Each of the reverse drive connections just described is controlled by a cam, which cams are mounted upon shaft 157, journaled in bearings upon the head 18 and extending parallel to the shaft 145. This shaft 157 is driven through a worm gear-wheel 158, meshing with a worm 159 upon the shaft 143.

160 is a cam controlling the reverse drive-gearing 147 through the medium of a link 161 and the lever 162, the latter being connected to the sleeve 154. 163 164 165 are cams similarly connected to a controlling reverse drive-gearing 148, 149, and 150. These cams are all properly timed to actuate their respective mechanisms, as will be hereinafter set forth.

It has been already stated that the rack-bar 111, controlling the opening and closing of the body-blank molds, is actuated through a pinion 112 upon a shaft 113, extending longitudinally within the column 2. This shaft 113 is driven through beveled gear-wheels 166, connecting it with the shaft 167, extending longitudinally of the base. Upon this shaft is arranged a reverse drive-gearing similar to those previously described and comprising the beveled gear-wheels 168, 169, and 170. The gears 168 and 170 are sleeved upon the shaft and may be alternatively coupled therewith through the medium of the sleeve 171, controlled by a lever 172, which in turn is controlled by a cam 173 upon the shaft 28. The gears 168, 169, and 170 are constantly driven through a gear-train 174, deriving its motion from the shaft 29. With the mechanism just described the shaft 167 may remain either stationary or be driven alternatively in opposite directions through the controlling of the cam 173, and this cam is so timed as to produce the required movement in the operation, as hereinafter set forth.

The suction and blowing connections for the molds are preferably constructed by arranging at the upper end of the extension 142 of the column 2 the revoluble suction-chamber 175 and the chamber 176 for the blowing air. The chamber 175 has a plurality of flexible connections 179, which are respectively connected to the conduits 102 of the several suction-heads. The blowing-chamber 176 is connected by a conduit 180 with the head 21. For controlling the air passing through this conduit a valve 181 is arranged therein, which is actuated by a cam 182 upon the shaft 157. This cam is timed to turn on and off the air from the head 21 at the proper points in the operation to effect the blowing of the blank.

As has been described, the suction communicates in the head 21 with both the annular chamber 64 thereof and also with the central aperture 63, so as to draw the air from the suction-mold both from the top of the cavity and through the crevice between the inner portions of the neck and body-blank molds. For blowing the blank air must be admitted only to the central chamber 63, and to accomplish this the connection is preferably formed through a passage 183, formed in the cover-plate 93. This passage connects at one end with the central aperture 63 and at its opposite end with a channel 184 in the head 21, which channel is connected to the conduit 180. Air connections also extend from the air-chamber 176 to each of the pneumatic motors 122 through the conduits 185. In each of these conduits is arranged a controlling-valve 186, which is actuated by a cam 186$^a$ on the shaft 157. 186$^b$ is a second valve in the conduit 185, arranged upon one of the trunnions 126 of the frame 118 and automatically operated by the swinging of said frame to alternatively connect with conduits 186$^c$ and 186$^d$, leading to opposite ends of the cylinder of the pneumatic motor 122, the arrangement being such that when the frame 118 is turned upward, so as to bring the finishing-molds in connection with the neck-molds, air will be admitted to the pneumatic motor to cause the closing of the finishing-mold sections about the blank. On the other hand, when the frame 118 is swung downward, carrying with it the bottle in the finishing-mold, the valves 186 and 186$^b$ will be operated to cause an opposite movement of the piston in the pneumatic motor 122, which will open the sections of the finishing-mold. The chambers 175 and 176 are provided with any suitable supply connections, such as the conduits 177 and 178, extending downwardly through the column.

Operation of the machine: The machine constructed as described may be moved in or out of operative relation to the tank 4 preferably by mounting the base 1 upon wheels 189, running upon a suitable track. When arranged in operating position, motion is communicated to the various parts of the mechanism from the motor 14, which is under the control of the operator. This motor is preferably provided with suitable speed-controlling devices, by which the speed of operation may be regulated according to the requirements. In the initial position of parts (shown in Fig. 4) the frame 20 upon the revoluble frame 3 is directly above the tank 4. The blank-molds carried by this frame are also closed and locked by the clamping mechanism described. The first operation is the lowering of the frame 20 to effect the dipping of the body-blank molds below the surface of the molten glass within the tank. This, as has been described, is accomplished by the cam 27 actuating the link 26, lever 25, rod 22, and head 23, causing the latter to move upward and through its engagement with the roll 35 to rock the lever 33 and through the medium of the link 32 lowering the frame 20. During this movement the cam 164 will cause the actuation of the reverse drive-gear 149 to impart a rotary motion to the shaft 92. This in turn will actuate the worm 91 and worm-segment 90, causing the rocking of the lever 88, and through it the downward movement of the lever 85, thereby lowering the plunger 66 until the core 67 is in position within the mold-cavity. A further movement of the lever 88 will effect the opening of the valve 103 through the medium of the arm 106, screw 107, lever 105, and stem 104. It will thus be understood that as soon as the mold is dipped into the molten glass, as shown in Fig. 5, the core will be in position and the suction is is applied, thereby filling the mold in the manner previously described. During the filling of the mold the frame 20 is held in its lowered position by a suitable formation of the cam 27. After a brief interval this cam will cause the reverse movement of connected mechanism, which will raise the frame 20 to its original position. Immediately succeeding this operation the cam 163 upon the shaft 157 will cause the operation of the reverse drive-gearing 148, which will cause the rotation of a shaft 83 and through the worm 82 and worm-segment 81 will rock the shaft 77, swinging the arm 76 downward. As this arm carries the cut-off blade 74, the latter will be moved across the lower end of the body-blank molds, severing the string of molten glass which has been drawn upward with the mold and forming a bottom for supporting the glass within the mold-cavity, as shown in Fig. 6. The suction-valve, which has been maintained open during the movement of the cut-off, is next closed. This is effected by the cam 164 actuating the reverse drive-gearing 149 to cause a rotation of the shaft 92 in the reverse direction and through the intermediate mechanism rocking the lever 88, so as to withdraw the screw 107 from contact with the lever 105. The spring 108ª will then cause the closing of the valve 103. The further movement of the lever 88 will take up the lost motion in slotted bearing 89 and cause the lifting of the lever 85, which in turn raises the cross-head 84 and plunger 66. Simultaneously the screw 99 will move downward the bearing 97 upon the guide 98, carrying the cam 96 and causing the latter to actuate the link 95, so as to move the cover 93 downward on the guides 94 until it contacts with the upper faces of the suction-head and closes the aperture 63. This also registers the passage 183 in said cover with the channel 184 in the head 21, so as to complete the connection for the blowing air. During the operations thus far described the revoluble frame 3 remains stationary and is locked in this position by reason of the engagement of the segmental flange 10 on the crank 6 with the concave bearing 9 on the star-wheel 5. As soon as this segmental bearing passes out of engagement the roller-wrist 7 will engage with one of the radial slots 8 and will impart a rotary movement of the star-wheel and the frame 3, which movement will bring another frame 20 into registration with the tank, after which the mechanism carried by said frame will repeat the operations which have been described. The period of time during which the glass is inclosed by the body-blank molds is determined by the cams 173. This period must be of sufficient length to partially chill the outer portion of the blank, so as to form a hardened skin that will temporarily maintain the shape of the blank. The length of time necessary for this operation is also partially determined by the mass of metal in the body-blank molds. At the end of this period the body-blank molds are opened by the cam 173 actuating the lever 172 and coupling-sleeve 171, so as to drive the shaft 167, beveled gear-wheels 166, and shaft 113. The pinion 112 on this latter shaft will then move the rack-bar 111 inward, causing the engagement of the hook 110 with the roll 114 and actuating the toggle connection 109. The arms 49 are thus drawn toward each other, and consequently the jaws 48 are swung outward, thereby separating the mold-sections 46 and 47, as shown in Fig. 8. The separation of the mold-sections is permitted for the reason that said sections have already been unclamped through the operation of the cam 160, reverse drive-gearing 147, shaft 62, worm 61, worm-gear 60, rock-shaft 57, and crank 58. The movement imparted to this crank lowers the cross-head 53 through the link 59, thereby carrying downward the rods 52 and clamping-hooks 51, so as to disengage the latter from the lugs 50. Simultaneously with or immediately succeeding the opening of the body-blank molds the cam 165 will actuate the reverse drive-gearing 150 to impart a rotation to the shaft 129, and through the worm 128 and worm-gear 127 will rock the frame 118, carrying upward the finishing-molds supported thereby. During the upward movement of the frame 118 the mold-sections 116 are in their opened positions and will thus pass upon opposite sides of the blank, which is suspended from the neck-mold. As soon, however, as the frame has completed its upward movement the valve 186 will be operated to cause a movement of the pneumatic motor 122, which will close the jaws 119, carrying the mold-sections 116. (Shown in Fig. 8.) The blowing air is next admitted to the head 21 by the operation of the cam 182, which opens the valve 181 in the conduit 180. This will cause the expansion of the blank until it fills out the cavity within the finishing-molds. When in the rotation of the frame 3 the roll 132 for the toggle-levers 130 actuating the neck-mold sections comes in contact with the cam 133 on the column, the said levers will be moved against the tension of the spring 131 into a position where the arms 44 are drawn toward each other and the jaws 43 are rocked outward. This will cause the opening of the neck-mold sections 41 and 42 sufficiently to disengage the same from the neck of the bottle. (Shown in Fig. 9.) While the neck-mold is open the frame 118 will be rocked downward again, thereby carrying the finishing-mold with the blown bottle therein.

(Shown in Fig. 10.) Following this movement the body-blank molds and neck-mold sections are again closed, the former by the actuation of the head 134, which engages with the roll 114, and the latter by the spring 131 after the disengagement of the roll 132 from the cam 133. The lowering of the frame 118 is preferably accomplished just before the frame 3 completes its revolution and registers the blank-forming molds with the tank. At the conclusion of the downward movement of said frame 118 the valve 186 is operated to reverse the pneumatic motor 122, thereby opening the sections 116 of the finishing-mold, so as to permit the completed bottle to drop out, as shown in Fig. 11. During the final movement of the frame 3 the cam 160 actuates the reverse drive-gearing 147 to again cause the clamping of the sections of the blank-mold before another operation of dipping.

It is to be understood that each of the separate groups of mechanism carried by the frame 3 operates in precisely the same way and the cycle of movements of each mechanism is completed in one revolution of the frame 3, so that in one revolution of the frame 3 the number of bottles completed is equal to the number of duplicate mechanisms.

In the modified form of machine shown in Figs. 17 to 28, A represents a suitable base. B is a standard extending upwardly and over the base. C is a vertical shaft journaled on the base and supported by the inner end of the arm B of the standard. This shaft may be driven in any suitable manner. I have shown it provided with a gear C', meshing with a suitable gear upon the driven shaft D, Fig. 17.

E is a sleeve surrounding the shaft C and secured to and moving therewith. Secured to or formed integral with the sleeve E is an arm or arms F.

G represents the parison-molds. These are shown in this case as sectional molds—that is, made in separable parts—and these mold-sections are supported upon arms $a$ at the lower end of the brackets $b$, which extend downward from the inner side of the head H. The mold-sections are pivoted upon the pivot-pin $c$, Fig. 20, and are normally held closed by the action of a spring $d$, and it is opened and closed in the manner and by the means hereinafter described. The head H is supported upon the outer ends of a lever I. This may be forked, or it may be made in two pieces, as shown in these drawings, being pivoted at its inner end to the sleeve E and pivoted at its outer end to the head H. In this case the two members are shown as being made of separate pieces upon opposite sides of the head H, and they are supported and in turn support the head and the mold G through the links I', which are connected to the slide J, Figs. 18 and 19, which slide works in suitable guides in a post J', as shown in detail in Fig. 22. This post has within it a spring K, resting beneath a shoulder on the slide J, which spring normally holds the lever I in its upper position, as illustrated in Fig. 22.

L is a pipe pivotally connecting into the sleeve E at its inner end and at its outer end pivotally connected into the head H, the passage therethrough communicating with the chamber K' in the interior of the head H and at its inner end connecting with the passage K'' in the sleeve. This tube or pipe L serves not only as an air-passage, as will be hereinafter described, but also to steady the head H and to insure the vertical movement of the mold G. The slide J extends upward above the post J' and is preferably provided with a roller-bearing $e$, engaging a cam $f$ on the under side of the arm L', which extends out from the overhanging portion of the standard B, as plainly shown in Figs. 17 and 18. This cam is of such shape that it will depress the slide at suitable points and through the connections described by pressing the spring K will push down the mold G. Whenever the pressure is relieved from the slide, the spring K will act to lift it again to its upper position, as will be easily understood from the description already given.

The parison or blank forming mold sections are opened and closed by means of a lever O, which is pivoted upon the post J' and has a bearing against a cam $h$ on the arm L' and at its lower end is connected to a block $i$, sliding in guides on the arm F and connected, by means of the links $k$, Figs. 18 and 20, with the mold-sections, it being evident that the molds being closed by the springs will be opened by the inward movement of the block $i$, which is effected by the rocking of the lever O, operated by its movement in relation to the cam $h$. Secured to the sleeve E and moving therewith is an arm M, pivotally connected and carrying at its outer end a mold-section M'. This mold-section is preferably such a section that when joined to the mold G will form a complete mold for the article in its finished shape. The arm M is raised and lowered by its engagement with the cam-track P and its incline $S^2$ on the base A, this cam-track being of suitable shape to give the raising and lowering movements to the mold-section M', hereinafter described.

I have shown a series of arms F extending radially from the sleeve E and in connection with each one a parison-mold G and a lower mold-section M' and actuating devices for these parts.

In the shaft C, I have shown two passages $m$ and $n$. At the lower end these passages connect into the annular chambers $o$ and $o'$, respectively, these chambers being formed in the sleeve E' on the base A with suitable packing to maintain a tight joint.

The chamber $o'$ connects with a source of air under pressure. (Not shown.) The chamber $o$ connects with an air-exhausting or vacuum apparatus, (not shown,) the passages $m$ and $n$, respectively, at their upper ends connecting into the annular chambers $r$ and $r'$, formed in the inner face of the sleeve E, and these two chambers connect by suitable passage with the common passage $K^2$. The connection between the two chambers $r$ and $r'$ and the passage $K^2$ is controlled by a valve Q, having a port $s$ extending therethrough. This valve is a sliding valve and is actuated in one direction by a spring $t$ and in the opposite direction by a cam $u$ upon the arm $L'$, the operation of the valve being such that when it is in its outer position the air-supply passage $n$ is cut off from the passage $K^2$ and the air-exhaust passage $m$ is connected therewith, and in its inner position the air-exhaust passage is cut off from communication with the passage $K''$ and the air-pressure passage is connected therewith. This will be obvious from an inspection of the construction shown in Fig. 18. The spring $t$ is not sufficiently strong to completely withdraw the valve Q from the sleeve E when the cam disengages from the valve; but, if desired, any suitable stop may be provided for limiting the outward thrusting of the valve when said spring expands as the cam recedes. I have shown a stop $K^3$ to limit the outward movement of the valve Q.

Passing through the head H is a plunger T, normally held in its lower position by the spring $T'$, as shown in Fig. 21. This plunger extends into the upper portion of the molds and acts as a forming-core therein. It extends out through the top of the head H and is provided with a roller U, adapted to engage with the cam-track V, Fig. 17, for lifting the plunger vertically at a suitable point in the operation.

W represents shear-blades pivotally mounted at the outer end of the arm F. Each shear-blade has an integral crank-arm extending rearwardly therefrom on the same side of the pivot as the blade, said crank-arms being connected by links $W'$ to the sliding block $W^2$, which is adapted to be reciprocated longitudinally of the arm by means of the lever X, pivoted to the post $J'$. This lever X is actuated in one direction to close the shear-blades by a cam $X'$ at the upper end thereof, while a spring $X^2$, connecting the lower end of the lever to the arm F, normally holds said lower end retracted and the blades open, as shown in Fig. 3.

S is a tank or body adapted to contain a pool of molten glass extending into operative relation to the parison-mold.

The parts being thus constructed their operation is as follows: Motion is imparted through the shaft D to the shaft C and to the sleeve E and its connected parts. As the parison-mold approaches the position of the glass pool or tank the cam $f$ is of such shape as to press down the slide J, which carries with it the lever I and the mold G. The plunger T at this time is projecting into the parison-mold G, as shown in Fig. 21, and the other parts at this time are in the position shown in Fig. 19. The mold is lowered by this movement until the opening in the lower portion thereof dips into and is sealed by the molten glass in the pool, as shown in Fig. 24. At this period the valve Q is actuated by the spring $t$, so as to connect the exhaust-passage $m$ with the passage $K''$ and through the pipe L with the interior of the head H and the mold G, exhausting the air therefrom, so that the atmospheric pressure will cause the molten glass to quickly be forced up into that mold and fill it. In this manner during the operation of the machine the molten glass in the pool will be gathered into or distributed in the successive parison-molds. In the construction shown in the drawings, Figs. 17 to 28, I have illustrated the mold G as a parison-mold of the shape of the neck of a bottle, the plunger T of any suitable length forming a core corresponding to the opening through the neck. As soon as the parison is thus formed by the atmospheric pressure the slide J is released from the cam $f$ and the spring K acts to quickly lift the parison-mold out of the molten glass. At this instant the valve Q may be shifted to shut off the exhaust. The travel and movements of the parison-mold are illustrated in the diagram Fig. 24. As soon as the mold G is raised free from the molten glass the cam $X'$ operates the lever X, which operates the slide $W^2$, and through the links $W'$ closes the shears W across the bottom of the parison-mold, cutting off the molten glass and acting as a bottom to support the lower end of the parison, as illustrated in the diagram Fig. 25. During this part of the travel the mold-section $M'$ has been passing below the tank, as shown in Fig. 18, and has run up the incline $S^2$ and is about to join the parison-mold. Just prior to this joining the spring $X^2$ actuates the shears to open the same, and immediately thereafter the lower mold-section $M'$ joins the parison-mold section, of which it forms a complementary part. At the same time the plunger T is lifted by the engagement of the roller U with the cam-track V, Fig. 17, into the position shown in Fig. 26. At this time the valve Q is actuated by the cam $u$, so as to connect the interior of the head H with the air-pressure passage $n$, and air under pressure being admitted thereunto the article will be blown into the shape of the two mold-sections, which in this case is illustrated as that of a bottle. As the mold continues its travel the air is shut off by the shifting of the valve Q into the position shown in Fig. 18, the mold-sections are opened by shifting the block $i$, and, finally, the bottom section $M'$ is lowered away from the position shown at the right hand, Fig. 17, by the incline S². At this time the bottom may be removed from the mold and the operation repeated.

My invention may be expressed in many other forms of mechanism, and I do not desire to be limited to the forms herein illustrated.

What I claim as my invention is—

1. In a glass-shaping machine, the combination of a sectional parison-mold, adapted to be dipped into a mass of molten glass, means for exhausting the air therefrom when dipped, to thereby fill the mold, means for closing the mold before dipping, and for opening the mold.

2. In a bottle-blowing machine, the combination of a blank-mold, a body or blowing mold, mechanism for bringing the blank-mold into operative relation to a mass of molten glass, means for moving the glass from the mass into said blank-mold to fill the same, means for bringing the body-mold into position for blowing the blank therein, and for blowing the blank in the body-mold.

3. In a bottle-blowing machine, the combination of a blank-mold and a body-mold, means for moving the blank-mold into operative relation to a body of molten glass and filling the same by air-pressure, and for blowing the parison thus formed in the body-mold.

4. In a bottle-blowing machine, the combination of a blank-mold, means for gathering the proper amount of metal for the article and forming the neck, consisting of means for forcing the metal by atmospheric pressure directly from a mass of molten glass into the blank-mold.

5. In a bottle-making machine, a parison-mold having an opening through which the molten glass may be caused to enter, mechanism for moving the open end of the parison-mold into operative relation to a mass of molten glass and means for moving the glass upward through said opening into the mold to form the parison.

6. In a bottle-blowing machine comprising a parison-mold, an air-exhaust device connected therewith, said mold having a filling-aperture adapted to be brought into operative relation with a mass of molten glass through which the glass will enter when the air is exhausted from the mold, and a body-mold adapted to inclose the parison and in which it is blown.

7. In a glass-machine, a blank-forming mold, open at one end, instrumentalities for causing the open end of said mold to move into operative relation to and withdraw from a molten mass, and means for exhausting the air from the mold when in such operative position.

8. In a glass-machine, a parison-mold adapted to be supported in juxtaposition to a molten mass, mechanism for gathering a portion of the mass into said parison-mold and for cutting off the parison from the mass, a blowing-mold adapted to be arranged about the axis of said parison, and means for blowing the parison in the blowing-mold.

9. In a glass-machine, a tank adapted to contain molten glass, a blank-forming mold open at one end, instrumentalities for causing the open end of the mold to dip into operative relation with and withdraw from the tank, and means for exhausting the air from the mold when in dipped position.

10. The combination of an open-bottom blank-forming mold, means for dipping the lower edge only into operative relation to a mass of molten glass, means for lifting the glass upward from the mass into the mold and a movable closure for the bottom opening.

11. The combination of a blank-forming mold having a fill-opening adapted to be placed with the opening in operative relation to a mass of molten glass, an air-exhaust device connected into the mold, and a cut-off operating across the fill-opening.

12. A glass gathering and shaping device comprising a blank-forming mold open at the bottom, an air-exhaust means connected into the mold at the top, and a transversely-acting cut-off at the bottom, forming a closure for the bottom opening.

13. A glass-blowing device comprising a mold-section open at the bottom, adapted to be moved into operative relation to a mass of molten glass, an air-exhaust connected into the mold at the top to fill the mold from the mass when the air is exhausted, and means for disconnecting the air-exhaust and for admitting air under pressure to blow the article into form.

14. In a glass-blowing machine, the combination with a parison-mold, means for filling that mold by gathering directly from a molten mass, means for cutting off the parison from the mass, mechanism for moving the parison to a blowing-point and coöperating mechanism for blowing the blank into a bottomed article.

15. In a glass-blowing machine a parison-mold, mechanism for gathering from a molten mass directly into the parison-mold, mechanism for moving the parison to the blowing-point, and coöperating mechanism for blowing the parison into form.

16. In a glass-blowing machine, a parison-mold, a blowing means connected to the end thereof, mechanism for gathering a portion of glass directly from a molten mass into said mold and into operative relation to said blowing means and for then blowing the gather to its form.

17. The combination of a mold, forming a holder for a parison, means for filling the mold by gathering metal directly from a molten mass into said holder, and means for subsequently shaping the parison while held thereby.

18. The combination of mechanism for gathering a quantity of glass from a molten mass, for simultaneously shaping it into a blank for blowing, and means for subsequently blowing it to form.

19. In a machine for shaping glass articles, the combination of coöperating mechanisms for simultaneously gathering directly from a mass of molten glass a shaped quantity of the glass having a blow-opening, and distributing the glass around said opening, and means by which the article may be blown.

20. A glass-gathering device comprising a blank-forming mold, mechanism for moving the same into operative relation to a body of molten glass, a mechanism for exhausting the air from the mold whereby a portion of the molten glass is caused to fill the mold, and means for cutting off the gathered glass from the mass, such cutting off being effected above the level of the molten mass.

21. The combination in a glass-blowing device, of a blank-mold having means for supporting the blank when formed therein, means for directly filling the mold by gathering from a mass of molten glass, and means for blowing the blank to its finished form while held by said supporting means.

22. The combination of a blank-shaping mold having a rib or recess in its upper part, means for directly filling the mold by gathering from a mass of molten glass, and for subsequently shaping the blank to its finished form while suspended by the glass of the blank engaging said rib or recess.

23. The combination of a parison-mold shaped to form a bottle-neck and contain sufficient glass to form the body, a core or stem projecting into the neck to form a blow-opening in the top of the blank, means for filling said mold and forming the neck with its blow-opening, by gathering the glass directly from the mass into the mold, a body-mold, and means for admitting air into the blow-opening in the neck to blow the blank to its finished form in the body-mold.

24. The combination of a parison-mold shaped to form a bottle-neck and contain sufficient glass for the body, a device for forming an initial blow-opening therein, means for gathering molten metal directly from the mass into said mold to fill the same, for cutting off the metal in the mold from the mass, and a body-mold in which the blank is adapted to be blown by air admitted into the initial blow-opening.

25. The combination of a parison-mold shaped to form a bottle-neck and contain sufficient glass for the body, a device for forming an initial blow-opening therein, means for gathering the molten metal directly from the mass into said mold to fill the same, and coöperating mechanism for shaping the parison to its final form.

26. A glass-shaping machine comprising a carrier, movable in a horizontal plane, an upwardly-movable blank-forming mold carried thereby and having an open lower end, and means for withdrawing the same from a molten-glass vessel, and cutting the glass from the open lower end thereof.

27. In a glass-machine, a mold having an opening through which the molten glass may be caused to enter, mechanism for moving the open end of the mold into operative relation to a mass of molten glass and means for moving the glass upward through said opening into the mold.

28. In a glass-dipping machine, the combination with a mold-section open on the bottom adapted to be supported adjacent to a tank or pool, means for arranging the mold-section vertically above the pool, for causing the mold-section to dip into operative relation to the pool, for exhausting the air in the mold-section while dipped, and for separating the glass and mold-section.

29. In a glass-shaping machine, the combination with an open-bottom mold, means for moving the bottom of said mold into operative relation to a pool of glass, for simultaneously exhausting the air therefrom, and for moving the filled mold away from the pool.

30. A glass-blowing device, comprising a mold open at one end and adapted to be dipped into operative relation to a mass of molten glass, means for exhausting the air from the mold when in dipped position to facilitate filling the mold from the mass, and means for throwing the exhausting means out of operative relation to the mold and for admitting air under pressure into the article to blow it into form, substantially as described.

31. In apparatus for the manufacture of hollow glass articles, the combination of a mold, a core, and means for drawing the molten glass into said mold and around said core to form a blank.

32. In apparatus for the manufacture of hollow glass articles, the combination of a mold, a core, and means for drawing the molten glass into said mold and around said core by suction to form a blank.

33. In apparatus for the manufacture of hollow glass articles, the combination of a mold, a core, and means for drawing the molten glass into said mold and around said core to form a finished portion and a blank.

34. In apparatus for the manufacture of hollow glass articles, the combination of a mold, a core, and means for drawing the molten glass into said mold and around said core by suction to form a finished portion and a blank.

35. In apparatus for the manufacture of glass blanks, the combination of a mold, a core, and means for gathering the molten glass into said mold and around said core and simultaneously forming a blank.

36. In apparatus for the manufacture of glass blanks, the combination of a mold, a core, and means for gathering the molten glass into said mold and around said core and simultaneously forming a finished portion and a blank.

37. In apparatus for the manufacture of glass blanks, the combination of a mold, a core, and means for gathering molten glass into said mold and around said core by suction and simultaneously forming a blank.

38. In apparatus for the manufacture of glass blanks, the combination of a mold, a core, and means for gathering the molten glass into said mold and around said core by suction and simultaneously forming a finished portion and a blank.

39. In a glass-shaping machine, automatic mechanism for gathering the glass and shaping it into a blowing-blank and for subsequently blowing the blank.

40. In a glass-shaping machine, the combination of a blank-mold, mechanism for automatically gathering the glass into the blank-mold, a blowing-mold, mechanism for automatically inclosing the blank in the blowing-mold, and for expanding it therein.

41. In a glass-shaping machine, the combination of a blank-mold having a core or plunger projecting into its upper end, a complementary blowing-mold, means for exhausting the air from the blank-mold and for admitting air under pressure into the blowing-mold, and mechanism for automatically operating these devices to successively move the blank-mold into operative relation to a body of molten glass, form the blank therein, withdraw the plunger, bring the blowing-mold into operative position to the blank, and to admit air into the blank to expand the same in the blowing-mold.

42. In a glass-shaping machine, the combination of a blank-mold, a cut-off for the end thereof, a removable plunger in the upper end of the blank-mold, a complementary blowing-mold, and mechanism for automatically causing the blank-mold to move into operative relation to and withdraw from molten glass, to form a vacuum in the blank-mold while in such operative relation to thus gather a blank therein, to operate the cut-off, to withdraw the plunger, to bring the blowing-mold into operative relation to the blank, and to expand the blank therein.

43. In a glass-shaping machine, the combination of a traveling arm or frame, a blank-mold and a cut-off carried thereby, a body-mold traveling with the blank-mold, means for dipping the blank-mold, filling the same, operating the cut-off, and for bringing the blowing or body mold into operative relation with the blank, and expanding the blank therein.

44. In a glass-machine, a traveling frame carrying a plurality of blank-forming molds, in combination with means for causing molten glass to flow from a supply thereof into the successive molds during the rotation of the frame to thereby form blanks, and means for shaping said blanks to final form.

45. In a glass-machine, a traveling frame, a plurality of blank-molds and a plurality of finishing-molds carried by said frame, in combination with means for causing molten glass to flow from a supply thereof into the successive blank-molds during the rotation of the frame, and means for bringing the finishing-molds and the blanks formed in said blank-molds into coöperative relation and finally shaping the blanks in the finishing-molds.

46. In a glass-shaping machine, the combination of a mold, mechanism for moving that mold into operative relation to a supply of molten glass, and means for taking from the supply a charge into said mold, means for shaping said charge into a blowing-blank, and means for expanding said blank into final form by air.

47. In a glass-shaping machine, a series of blank-forming molds and mechanism for moving said molds successively into operative relation to a supply of molten glass and charging said molds to form blanks, in mechanical combination with finishing-molds, and means for successively bringing the blanks thus formed and the finishing-molds into coöperative relation and expanding the blanks therein.

48. In a glass-shaping machine, a mold, mechanism for moving it into operative relation to a supply of molten glass and forming a blank therefrom in the mold, in mechanical combination with means for expanding the blank to final form.

49. In a glass-shaping machine, a blank-forming mold having a neck portion and an open-ended body portion, the length of the mold-cavity being substantially equal to the length of the article to be made, and means for charging the mold-cavity with molten glass through the open end of the body portion, by air-pressure.

50. In a glass-shaping machine, a blank-forming mold having an open-ended body portion and a finishing-mold of substantially the same internal length, in combination with means for filling the blank-forming mold through the open end of the body portion, to thereby form a blank, and means for bringing the blank and the finishing-mold into coöperative relation and blowing the blank to final shape therein, by expanding it only laterally.

51. In a glass-shaping machine, a blank-forming mold having a neck portion and an open-ended body portion, and means for filling the same with the molten glass through the open end of the body portion, in combination with a finishing-mold having substantially the same internal length as the blank-forming mold and means for blowing the blank to final shape in said finishing-mold.

52. In a glass-machine, a traveling frame and a plurality of blank-molds carried thereby and shaped to form the upper end of the finished articles, in combination with means for moving said frame to a supply of molten glass and successively charging said molds therewith and exhausting the air therefrom while being charged.

53. In a glass-machine, a traveling frame and a plurality of molds carried thereby and shaped to form the upper end of the finished articles, each of said molds having a removable core or stem adapted to form the initial blow-opening in the end of the blank, in combination with means for moving said frame and successively dipping said molds into operative relation to a supply of molten glass and exhausting the air therefrom while dipped.

54. In a glass-machine, a traveling frame, a plurality of molds carried thereby and shaped to form the upper end of the finished articles, each of said molds having a removable core or stem adapted to form the initial blow-opening in the end of the blank, and a corresponding plurality of finishing-molds also carried by said frame, in combination with means for moving said frame and successively dipping the molds into operative relation to a supply of molten glass and exhausting the air therefrom while dipped, and means for then bringing the blanks thus gathered and the finishing-molds into coöperative relation and admitting air-pressure to the blow-openings in the ends of the blanks to blow them into final shape in said finishing-molds.

55. In a glass-machine, a traveling frame carrying a plurality of molds, in combination with means for moving said frame and successively moving said molds into operative relation to a supply of molten glass and exhausting the air from the molds while in such operative relation.

56. In a glass-machine, a traveling frame carrying a plurality of molds, in combination with means for moving the frame and successively moving the molds into operative relation to a supply of molten glass and exhausting the air from the molds to fill them with glass, and means for cutting off the glass at the inlet ends of the molds when they have been filled.

57. In a glass-machine, a traveling frame, a plurality of blank-molds and a plurality of finishing-molds carried by said frame, each of the blank-molds being associated with one of the finishing-molds, in combination with means for moving the frame and successively dipping the blank-molds into operative relation to a supply of molten glass and exhausting the air from the molds to fill them with glass, means for bringing the blanks thus gathered by the blank-molds and the corresponding finishing-mold into coöperative relation, and means for blowing the blanks to shape in the latter molds.

58. In a glass-machine, a traveling frame, a plurality of blank-molds and coöperating cut-off devices, and a corresponding plurality of finishing-molds, all carried by said frame, in combination with means for intermittently moving said frame and successively moving the blank-molds to a supply of molten glass and exhausting the air from said molds, means for operating the cut-off devices to sever the glass in the blank-molds from the supply of molten glass, and means for thereafter bringing the blanks thus gathered by the blank-molds and the finishing-molds into coöperative relation and blowing the blanks into final shape in said molds.

59. In a glass-machine a rotary frame, a plurality of blank-molds carried thereby, each composed of an upper and a lower portion, and a corresponding plurality of finishing-molds also carried by said rotary frame, in combination with means for rotating the frame and successively moving the blank-molds to a supply of molten glass and exhausting the air from said molds, and means for removing the lower portions of the blank-molds from the blanks gathered therein and bringing said blanks and the finishing-mold into coöperative relation and blowing them to final shape in said molds.

60. In a glass-machine, a rotary frame, a plurality of blank-molds carried thereby and each composed of an upper and a lower portion, a corresponding plurality of cut-off devices associated with the respective blank-molds, and a corresponding plurality of finishing-molds also carried by the rotary frame, in combination with means for rotating said frame and successively moving the blank-molds to a supply of molten glass, and exhausting the air therefrom, means for operating the cut-off devices to sever the gathered blanks from the supply of molten glass, and means for removing the lower portions of the gathering-molds from the blanks and bringing the blanks and the finishing-molds into coöperative relation and blowing the blanks to final shape therein.

61. In a glass-machine, a rotary frame, a plurality of molds carried thereby, and a common air-exhaust passage and connected by valve-controlled exhaust pipes or passages with the respective molds, in combination with means for rotating said frame and successively moving the molds into operative relation to a supply of molten glass and operating the valves controlling the exhaust-pipes.

62. In a glass-machine, a rotary frame, a plurality of blank-molds and a corresponding plurality of finishing-molds carried by said frame, a common exhaust-passage and a common air-pressure passage having valve-controlled connections with the respective blank-molds, in combination with means for rotating said frame and successively moving said blank-molds into operative relation to a supply of molten glass and operating the valves to connect said molds with the exhaust while in such operative relation, means for then bringing the blanks gathered by said molds and the finishing-molds into coöperative relation and connecting the air-pressure with said molds to blow the blanks into final shape therein.

63. In a glass-machine, a frame rotatable in a horizontal plane and carrying a plurality of vertically-movable molds, in combination with means for rotating said frame and successively lowering the molds to a supply of molten glass and pneumatic means for introducing the glass into said molds.

64. In a glass-machine, a frame rotatable in a horizontal plane and a plurality of vertically-movable molds carried thereby, in combination with means for rotating said frame and successively lowering said molds to and raising them from a supply of molten glass and exhausting the air from the molds while in such lowered position.

65. In a glass-machine, a frame rotatable in a horizontal plane, a plurality of vertically-movable molds and a corresponding plurality of cut-off devices carried by said frame, in combination with means for rotating said frame and successively lowering the molds into operative relation to a supply of molten glass and exhausting the air from the molds, and means for raising the molds from the supply of glass and operating the cut-off devices to sever the gathered glass therefrom.

66. In a glass-machine, a frame rotatable in a horizontal plane, a plurality of vertically-movable molds and a corresponding plurality of cut-off devices carried by said frame, in combination with means for rotating said frame and successively lowering the molds into and raising them from operative relation with a supply of molten glass, exhausting the air from the molds while in lowered position, and operating the cut-off devices after the molds have been raised.

67. In a glass-machine, a frame rotatable in a horizontal plane, a plurality of vertically-movable blank-molds and a plurality of finishing-molds carried by said frame, each of said blank-molds being associated with one of the finishing-molds, in combination with means for rotating the frame and successively lowering the blank-molds into operative relation to a supply of molten glass and exhausting the air therefrom, means for raising said molds from the supply of glass and then bringing the blanks and the finishing-molds into coöperative relation during the succeeding movements of the frame, and means for blowing the blanks to shape in said finishing-molds.

68. In a glass-machine, a frame rotatable in a horizontal plane, a plurality of vertically-movable blank-molds and coöperating cut-off devices, and a corresponding plurality of finishing-molds, all carried by said frame, in combination with means for rotating said frame and successively lowering the blank-molds into and raising them from operative relation with a supply of molten glass, and exhausting the air from said molds, means for operating the cut-off devices to sever the glass in the blank-molds from the supply of molten glass, and means for bringing the blanks thus gathered by the blank-molds and the finishing-molds into coöperative relation during the succeeding movement of the frame and blowing the blanks into final shape in the latter molds.

69. In a machine for gathering glass, a hollow gathering-head, and means whereby the air in the head may be exhausted to cause the glass to enter therein in combination with means for bringing the head into operative connection with the glass.

70. A glass-dipping machine comprising a dipper-carrier movable in a horizontal plane, an upwardly-movable dipper having an open lower end, means for moving the said dipper vertically in relation to a molten-glass vessel, and means for charging and discharging the said dipper.

71. In a glass-machine, a dipper having an opening through which the molten glass may be caused to enter, mechanism for moving the open end of the dipper into operative relation to a mass of molten glass and means for moving the glass upward through said opening in the dipper.

72. In a glass-shaping machine, the combination with a dipper, open on the bottom adapted to be supported adjacent to a tank or pool, and means for arranging the dipper vertically above the pool for causing the dipper to dip into operative relation to the pool, for exhausting the air in the dipper while dipped, and for separating the glass and dipper.

73. In a glass-shaping machine, the combination with an open-bottom dipper, means for dipping the bottom of said dipper into operative relation to a pool of glass, for simultaneously exhausting the air therefrom, and for moving the filled dipper away from the pool.

74. In a glass-machine, a dipper open at one end, instrumentalities for causing the open end of said dipper to dip into operative relation to and withdraw from a molten mass, and means for exhausting air from the dipper when in dipped position.

75. In a glass-machine, a tank adapted to contain molten glass, a dipper open at one end, instrumentalities for causing the open end of the dipper to dip into and withdraw from operative relation with the tank, and means for exhausting the air from the dipper when in dipped position.

76. A glass-dipping machine comprising a carrier, movable in a horizontal plane, an upwardly-movable dipper carried thereby and having an open lower end, and means for withdrawing the dipper from the molten-glass vessel and cutting the glass from the open lower end thereof.

77. The combination of a dipper having a fill-opening adapted to be placed with the opening in operative relation to a mass of molten glass, an air-exhaust device connected into the dipper, and a cut-off operating across the fill-opening.

78. A glass-gathering device comprising a dipper open at the bottom, an air-exhaust means connected into the dipper at the top, and a transversely-acting cut-off at the bottom, forming a closure for the bottom-opening.

79. A glass-gathering device comprising a cup, mold, or holder, mechanism for moving the same into operative relation to a body of molten glass, a mechanism for exhausting air from the holder, whereby a portion of the molten glass is caused to fill the holder, and means for cutting off the gathered glass from the mass, such cutting off being effected above the level of the molten mass.

80. In a glass-shaping machine, the combination of a blank-mold and a finishing-mold, of connected mechanism for automatically moving the blank-mold into charging relation to a mass of molten glass, and thereafter for bringing the blank thus formed and the finishing-mold into operative relation, and expanding the blank in the finishing-mold.

81. In a machine for forming hollow glass articles, a mold, mechanism for moving the mold directly into operative relation to a supply of molten glass, means for charging the mold and forming the charge into a blank, in mechanical combination with means for expanding the blank into a finished article.

82. In a glass-shaping machine automatic mechanism for simultaneously gathering a charge of glass and giving shape to a portion of the charge.

83. In a glass gathering and shaping device, mechanism for gathering and shaping a glass blank comprising a mold having an opening which may be dipped into a mass of glass, a rib or recess near one end of the mold by which the formed blank may be suspended, means for exhausting the air from the mold, and means for making an indentation or blow-opening in one end of the gathered blank.

84. The combination of a blank-forming mold, having one end shaped to form a portion of the finished article, and its opposite end open, means by which the open end of said mold may be moved into operative relation to a pool of molten glass, means for exhausting the air from said mold and a stem or core adapted to be projected into and withdrawn from that end of the mold which is adapted to give finished shape to the article.

85. The combination of a blank-mold adapted to shape the blank and having means for suspending the blank for subsequent operations, means for charging said mold directly from a molten mass and means for forming an initial blow-opening in the end of the blank.

86. The combination of a mold having its cavity shaped to form a neck and an attached solid body portion, the body portion of the mold having a charging-opening, automatic means for charging the mold with molten glass through the open end of the body portion, and means at the neck portion for forming an initial blow-opening or cavity.

87. The combination of a blank-mold, a unitary mechanism for charging said mold with a definite charge of glass and shaping it into a blank, and coöperating mechanism for expanding the blank into a hollow article.

88. The combination with a tank or pool adapted to contain a mass of molten glass, of a blank-mold, driven mechanism for charging said mold with glass from the pool and shaping it into a blank and coöperating mechanism for expanding the blank into a hollow article.

89. The combination with a blank-mold, driven mechanism for charging said mold with a definite charge of glass from a tank or pool and shaping it into a blank, and coöperating mechanism for expanding the blank into a hollow article.

In testimony whereof I affix my signature in presence of two witnesses.

MICHAEL J. OWENS.

Witnesses:
JAMES WHITTEMORE,
H. C. SMITH.